United States Patent Office

3,489,693
Patented Jan. 13, 1970

3,489,693
CARBON DIOXIDE ABSORBENT
Robert M. Bovard, Costa Mesa, Calif., assignor, by mesne assignments, to "Automatic" Sprinkler Corporation of America, Cleveland, Ohio, a corporation of Ohio
No Drawing. Filed Apr. 3, 1967, Ser. No. 627,684
Int. Cl. B01j 11/06
U.S. Cl. 252—475         3 Claims

ABSTRACT OF THE DISCLOSURE

Small amounts of lithium hydroxide monohydrate are combined with magnesium oxide to provide an activated carbon dioxide absorber which is of relatively high valence, in oxide form to minimize water production during absorption, and of minimal solubility to alleviate the caustic hazard in submarine environments.

SUMMARY OF DISCLOSURE

This invention relates to carbon dioxide absorption compositions and more particularly to such compositions which have minimal water solubility with high absorption characteristics. Specifically this invention relates to carbon dioxide absorbing compositions consisting essentially of lithium hydroxide activated magnesium oxide.

DISCLOSURE

The use of alkali and alkaline earth metals for carbon dioxide absorption in air purification has been known for many years. Most favored has been a composition named "Baralyme" which has had a varying composition over the years. Originally "Baralyme" was composed of 80% calcium hydroxide and 20% barium hydroxide octahydrate with a trace of wetting agent. More recently this composition has been modified to incorporate the potassium hydroxide therein. Alternative compositions include other alkali metal hydroxides such as sodium or lithium hydroxide etc.

These compositions are generally quite satisfactory for normal air purification systems for the removal of carbon dioxide. However, in undersea environments where there is a possibility of water flooding of the composition canister, a problem is created which renders the above noted standards unsuitable. This is caused by the solubility characteristics of the Baralyme components or the alkali metal hydroxides. Briefly these components are in varying degree quite water soluble and produce caustic solutions easily. The hazard of causic injury from these components thus becomes apparent in an undersea environment where leakage of the water into the canister of an absorption agent would immediately produce a strong caustic solution.

In view of the known reactions of oxides and hydroxides with carbon dioxide it is apparent that the most desirable reactants would be the oxides since in the reaction with carbon dioxide only a carbonate is formed. However, neither the hydroxide or oxide will react with dry carbon dioxide so there must be some water present. Of course this required presence could result in the above noted causticizing if it were not strictly controlled. One additional dictate of a satisfactory absorption system is maximum reactivity. From this it is desirable to utilize an alkali earth metal rather than an alkali metal in that the former acts on a one-to-one molar ratio while the latter requires two moles for each mole of carbon dioxide present in order to produce the carbonates.

In considering all possible alkali and alkaline earth metals for use in absorbers it appears from both solubility, state, and valence that magnesium oxide would be most desirable for use in carbon dioxide reactions. This material is extremely preferable in undersea applications because of its minimal solubility in the hydroxide form, its bivalency and of course its oxide nature. However it suffers from the disadvantage of being very weak in its reaction with carbon dioxide and in itself a poor absorber thereof.

Therefore it is an object of the instant invention to provide a carbon dioxide absorption composition which eliminates the caustic hazard of undersea use while maintaining high activity for absorption.

It is a further object of the instant invention to provide an absorbing composition which is predominantly formed of a bivalent oxide for maximum reactivity with carbon dioxide with minimal water formation.

It is still a further object of the instant invention to provide an absorption composition comprising predominantly magnesium oxide so modified as to be highly reactive to carbon dioxide.

It is another object of the instant invention to activate magnesium oxide for carbon dioxide absorption whereby the water necessary for initiating and maintaining the reaction is provided by the activator.

These and other objects will become apparent from the following description and claims.

It has been found that magnesium dioxide can be formed into highly reactive material with carbon dioxide by incorporation of lithium hydroxide therein, compacting under high pressure, granulating and drying. The basic composition of the instant invention contains only two components i.e magnesium oxide and lithium hydroxide monohydrate ($LiOH \cdot H_2O$) there being no need for additional wetting agents, etc. as in "Baralyme."

The composition of the instant invention may contain from about 60 to 95% magnesium oxide with 40 to 5% lithium hydroxide monohydrate although it is preferred for a maximum effective range that the composition contain 85 to 90% magnesium hydroxide and 10 to 15% lithium hydroxide monohydrate. Optimum results have been obtained with an 88–12 blend (all proportions are by weight percent).

In producing the composition of the instant invention the components are mixed in granular form, compressed at pressure from 15,000 to 30,000 lbs. per square inch to form a cake, granulated in the conventional granulator or drier to the desired size and dried in an oven at temperatures of from 100 to 150° C. Except for the addition of magnesium oxide this technique is similar to that described in the Schechter et al. Patent 2,629,652 issued Feb. 24, 1953, it having been discovered that even with the incorporation of a high percentage of magnesium oxide, a free flowing granular product of high durability and hardness is produced.

As pointed out above the magnesium oxide is not highly carbon dioxide reactive in its natural state. With the addition of the minor proportions of lithium hydroxide monohydrate the mangesium oxide becomes highly reactive. The water from the monohydrate is sufficient to allow the absorption of the carbon dioxide by the magnesium oxide but is not completely understood how the lithium hydroxide acts to acclerate the reaction. It may be theorized that the lithium hydroxide either produces some unique condition to make the magnesium oxide-carbon dioxide reaction occur or alternatively reacts itself with the carbon dioxide with a subsequent reaction of the magnesium oxide with the lithium carbonate so produced.

Having described the general details of the instant invention, the following is a specific example of a composition produced thereunder:

Example

A mixture of 12% lithium hydroxide monohydrate was combined with 88% magnesium oxide and pressed into a cake under 25,000 p.s.i. The cake was granulated and dried in an oven at 120° C. for 1½ hours. The mixture was placed in canisters and air containing 3% carbon dioxide passed therethrough. Analysis of the resultant gas stream showed substantially immediate full carbon dioxide reaction during gas flow. Analysis of the granulated product after gas passage showed substantial conversion of the magnesium oxide to magnesium carbonate.

In view of the low solubility of magnesium oxide and the minimal presence of lithium hydroxide, the composition of the instant invention exhibited little caustic hazard when water flooded. This was particularly the case with compositions containing minimal lithium hydroxide concentrations.

Although this invention has been described on the basis of uniformly mixtures of magnesium oxide it is within the scope of this invention to utilize the magnesium oxide as a coating over lithium hydroxide whereby after heating a gas permeable coating is formed which allows air penetration for removal of carbon dioxide both by the internally contained lithium hydroxide and also by the lithium hydroxide activated magnesium oxide coating. The porosity of the magnesium oxide coating is such as to exclude water passage with its resultant caustic problem.

It is also possible that other known absorbers may be incorporated in the composition of the instant invention particularly where the use is above ground or in other environments where caustic hazards are not important. Similarly other inert materials may be combined with the composition to vary the bulk density or other physical properties thereof.

While particular details of the invention have been disclosed it will be understood, of course, that the invention is not limited thereto, since many modifications may be made and it is, therefore, contemplated by the appended claims to cover any such modification that falls within the true spirit and scope of the invention.

What is claimed and desired to be secured by Letters Patent is:

1. A composition to absorb carbon dioxide consisting essentially of about 60 to 95% magnesium oxide in intimate mixture with from 40 to 5% lithium hydroxide monohydrate.

2. The composition of claim 1 wherein the magnesium oxide is present in from 85 to 90% and the lithium hydroxide monohydrate is present in from 10 to 15%.

3. The composition of claim 1 containing 12% lithium hydroxide monohydrate and 88% magnesium oxide.

References Cited

UNITED STATES PATENTS

| | | | |
|---|---|---|---|
| 3,141,729 | 7/1964 | Clarke | 23—4 |
| 3,274,125 | 9/1966 | Clarke | 252—466 |
| 3,321,277 | 5/1967 | Bach | 23—184 |
| 2,462,277 | 2/1949 | Naugle | 252—413 |
| 2,382,371 | 8/1945 | Utterback | 196—52 |
| 3,207,700 | 9/1965 | Saffer | 252—443 |

DANIEL E. WYMAN, Primary Examiner

P. M. FRENCH, Assistant Examiner

U.S. Cl. X.R.

23—2.1; 252—476